United States Patent
Tsironis (10) Patent No.: US 12,498,407 B1
(45) Date of Patent: Dec. 16, 2025

(54) REVOLVING TRI-BAND TUNING PROBE WITH SINGLE CONTROL

(71) Applicant: Christos Tsironis, St-Laurent (CA)

(72) Inventor: Christos Tsironis, Kirkland (CA)

( * ) Notice: Subject to any disclaimer, the term of this patent is extended or adjusted under 35 U.S.C. 154(b) by 188 days.

(21) Appl. No.: 18/544,895

(22) Filed: Dec. 19, 2023

(51) Int. Cl.
*G01R 29/08* (2006.01)

(52) U.S. Cl.
CPC .................. *G01R 29/0878* (2013.01)

(58) Field of Classification Search
CPC ............ G01R 29/0878; G01R 1/203; G01R 31/2822; G01R 31/2601; G01R 31/2612; G01R 35/005; G01R 27/04; G01R 27/32; H01P 1/212; H01P 5/04; H01P 3/023; H03H 7/40; H03H 7/38; H03J 7/00; H03J 3/00
See application file for complete search history.

(56) References Cited

U.S. PATENT DOCUMENTS

| | | |
|---|---|---|
| 6,980,064 B1 | 12/2005 | Boulerne |
| 8,098,112 B2 | 1/2012 | Simpson |
| 8,358,186 B1 | 1/2013 | Tsironis |
| 9,252,738 B1 | 2/2016 | Tsironis |
| 9,276,551 B1 * | 3/2016 | Tsironis .................... H03J 3/00 |
| 9,625,556 B1 | 4/2017 | Tsironis |
| 10,345,422 B1 * | 7/2019 | Tsironis ............ G01R 31/2612 |
| 10,693,208 B1 * | 6/2020 | Tsironis ................ G01R 27/04 |

OTHER PUBLICATIONS

"Load Pull" [online] Wikipedia, [Retrieved on Aug. 24, 2017]. Retrieved from Internet <URL: https://en.wikipedia.org/wiki/Load_pull>.
"Computer Controlled Microwave Tuner—CCMT", Product Note 41, Focus Microwaves Inc., Jan. 1998.

* cited by examiner

*Primary Examiner* — Eman A Alkafawi
*Assistant Examiner* — Suresh K Rajaputra (57) ABSTRACT

Triple band remotely configurable tuning probes for slide screw impedance tuners allow instantaneous larger frequency coverage beyond the capacity of existing tuning probes using the single horizontal and vertical axis mechanism of a prior art single probe, single band tuner. This is done by installing three slugs of different length and frequency coverage on a revolving disc-formed holder, which rotates inside the legs of a captive unit and locks in distinct angles. The captive unit is attached to the vertical control mechanism of the tuner and rotation is ensured using a permanent fork close to the idle port of the tuner. An automated procedure ensures remote toggling between tuner states. Calibration and tuning is as in prior art single probe tuners.

7 Claims, 7 Drawing Sheets

REVOLVING TRI-BAND TUNING PROBE WITH SINGLE CONTROL

PRIORITY CLAIM

Not Applicable

CROSS-REFERENCE TO RELATED ARTICLES

1. "Load Pull" [online] Wikipedia, [Retrieved on 2017 Aug. 24]. Retrieved from Internet <URL: https://en.wikipedia.org/wiki/Load_pull>.
2. "Computer Controlled Microwave Tuner, CCMT", Product Note 41, Focus Microwaves Inc. 1998, pages 2-4.
3. Tsironis, C. U.S. Pat. No. 8,358,186, "Impedance Tuners with Resonant Probes".
4. Boulerne, P. U.S. Pat. No. 6,980,064, "Slide-screw Tuner with Single Corrugated Slug".
5. Simpson, G. U.S. Pat. No. 8,098,112, "Impedance Tuner Systems and Probes".
6. Tsironis, C. U.S. Pat. No. 9,252,738, "Wideband Tuning Probes for Impedance Tuners and Method".
7. Tsironis, C. U.S. Pat. No. 9,625,556, "Method for Calibration and Tuning with Impedance Tuners".

BACKGROUND OF THE INVENTION

This invention relates to general microwave testing and in particular to testing of microwave transistors (DUT) in the high frequency (typically GHz range) domain using Load Pull (see ref. 1). Load Pull is a measurement method whereby the load impedance presented to the DUT at a given frequency is changed systematically and the DUT performance is registered, with the objective to find an optimum embedding (matching) network for obtaining the design objectives, which may be maximum gain, power, efficiency, linearity or else.

PRIOR ART

Figure 1:
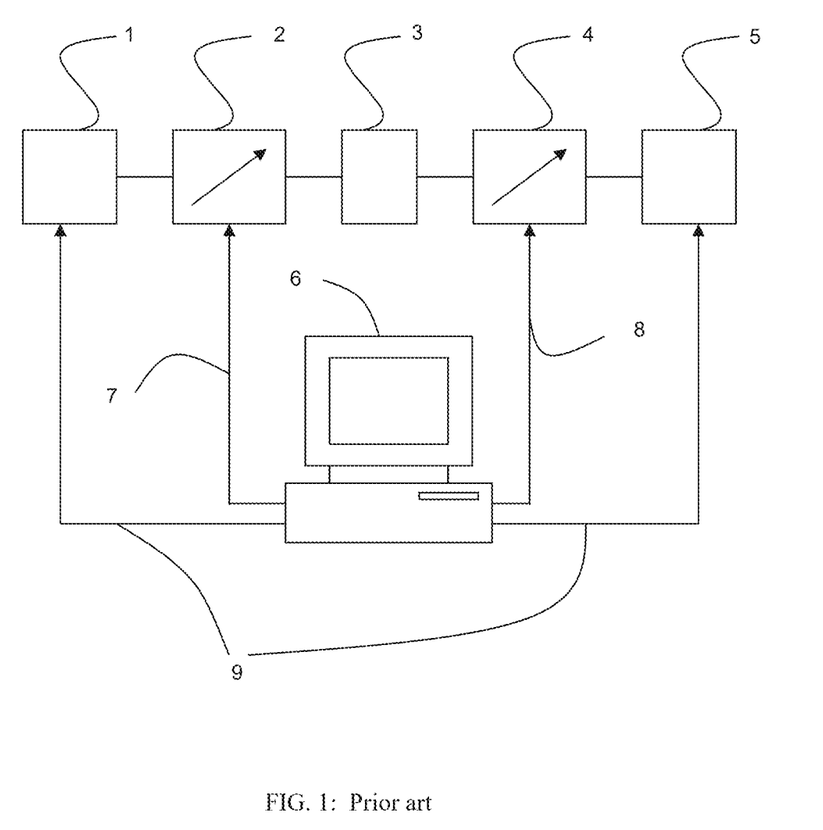
FIG. 1 depicts prior art, a typical scalar (measuring amplitude only) load pull test system using pre-calibrated passive tuners.

The popular load pull method for testing and characterizing medium to high-power microwave transistors (DUT, device under test) is called "load-pull" and uses appropriate test setups (FIG. 1), see ref. 1. Low noise transistors are tested using "source-pull". Load or source pull use impedance tuners 2, 4 (see ref. 2) and other test equipment, such as signal or noise sources 1, test fixtures housing the DUT 3, and power meters or low noise receivers 5, the whole controlled by a computer 6; the computer controls and communicates with the tuners 2, 4 and the other equipment 1, 5 using digital cables 7, 8, 9. The tuners are used in order to manipulate the microwave impedance conditions in a systematic and controlled manner, under which the DUT is tested (see ref. 1); impedance tuners allow determining the optimum impedance conditions of embedding networks for designing amplifiers and other microwave components for specific performance targets, such as noise parameters, gain, efficiency, intermodulation etc. For devices in chip-form, tested preferably on-wafer (see ref. 5), the insertion loss between the DUT and the tuner reduces the effective reflection factor $\Gamma_{LOAD}$ at the DUT reference plane. The only method to increase the reflection factor in a passive system is increasing the reflection factor of the tuner. Since the tuning probe 34 is capacitively coupled with the center conductor 33, this means increasing the maximum controllable capacitance by increasing the surface between the probes and the center conductor, which is possible, while avoiding a short circuit, only by increasing its horizontal length 37. Various types of resonant or combination tuning probes, including one or more slugs, have been reported before (see ref. 3, 4, 5 and 6); however, none includes a configurable revolving tuning probe assembly to enhance the tuner frequency coverage, controlled using the existing horizontal and vertical movement control of a single probe tuner.

BRIEF DESCRIPTION OF THE INVENTION

The objective of this invention is a triple frequency range remotely configurable tuning probe system for single vertical axis slide screw impedance tuners, that allows larger overall frequency coverage beyond the capacity of each individual tuning probe (slug), using only the single horizontal movement and vertical axis control mechanisms of existing single probe, single frequency range tuners. This is done by combining three tuning slugs of different length into a revolving tuning assembly, the slugs being mounted and controlled by the same mobile tuner carriage using a single vertical axis mechanism as shown in FIG. 4, which (a) allows larger maximum to minimum frequency coverage, (b) can replace existing tuning probes in existing tuners without additional remote-control and (c) can use existing tuner calibration and data processing routines, (see ref. 7) all this effected with minimum cost and without requiring critical structural modification to existing tuners, additional internal remotely controlled mechanisms and/or external manual intervention.

DETAILED DESCRIPTION OF THE DRAWINGS

The invention and its mode of operation will be better understood from the following detailed description when read with the appended drawings in which:

FIGS. 5A through 5B depict cross sections of the tuning assembly.

DETAILED DESCRIPTION OF THE INVENTION

Figure 2:
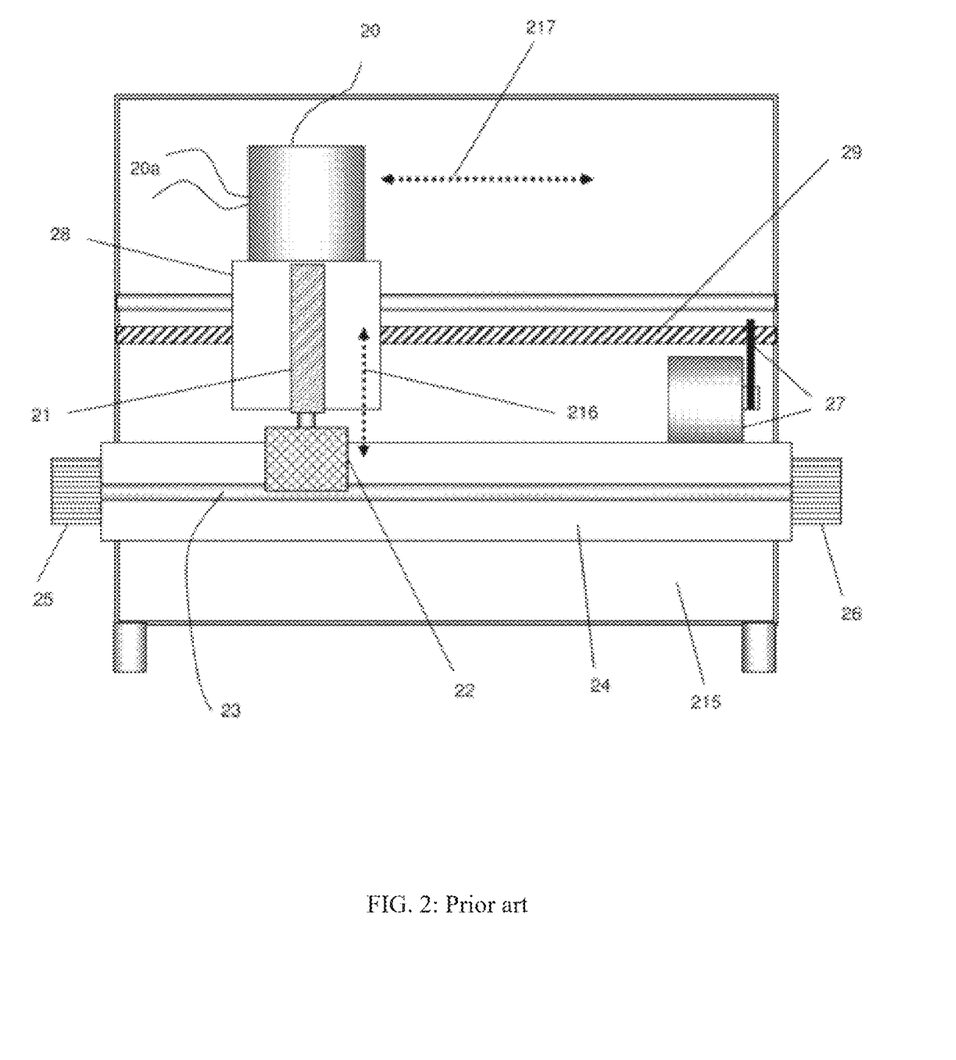
FIG. 2 depicts prior art, a schematic front view of a passive slide screw load pull tuner.

A typical slide screw tuner is shown in FIG. 2: it includes a slabline 24 with a center conductor 23, a test port 25 and an idle port 26. Inside the tuner housing 215 there is a mobile carriage 28 traveling 217 along the slabline, driven by a screw 29 and a motor and gear 27; in the carriage 28, there is a vertical axis mechanism 21 moving towards and away 216 from the slabline and holding a tuning probe (slug) 22 capacitively coupled with the center conductor 23. The vertical axis mechanism 21 and the slug 22 are controlled by a second vertical motor 20 which is also remotely controlled 20a. It is this type of traditional, proven tuner technology this invention uses for the combination tuning probe.

Figure 3:
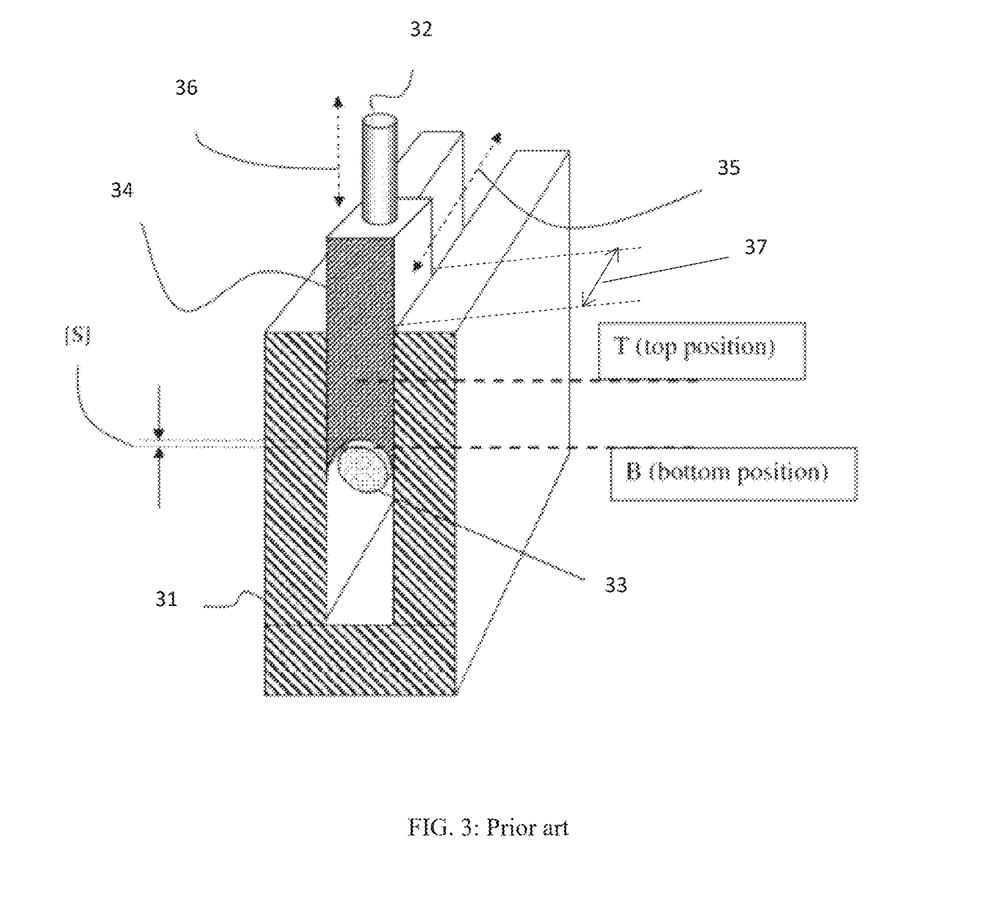
FIG. 3 depicts prior art, a perspective view of a metallic reflective tuning probe (slug).

The typical prior art tuning probe (slug) is shown in FIG. 3: it includes a body 34 and has a concave bottom mirroring the diameter of the center conductor 33 of the slabline 31 and a holding stud 32 to be attached to the vertical axis mechanism 21. The slug moves vertically 36 and horizontally 35 controlled by the axis 21 and the carriage 28. Vertically it moves between a top position T and a bottom position B leaving a small gap [S] to avoid a short circuit. The length 37 of the parallelepiped slug is defined along the axis of the slabline, the thickness is defined perpendicular to the axis of the slabline.

Figure 4:
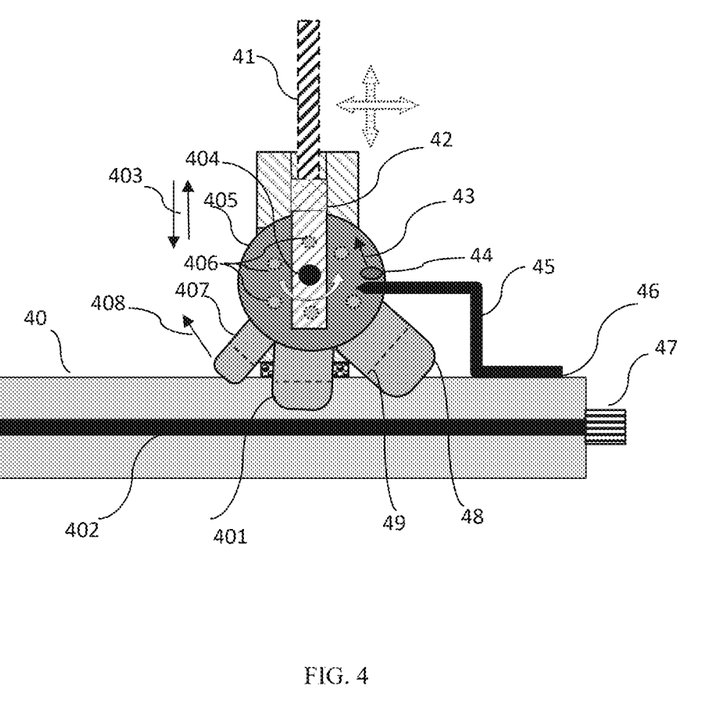
FIG. 4 depicts a vertical cross section of the configurable tuning probe system comprising the disc (405) holding the tuning probes (slugs, 407, 401 and 48), the vertical axis (41) and, in the background, the leg of the saddle unit (42).
Figure 5A:
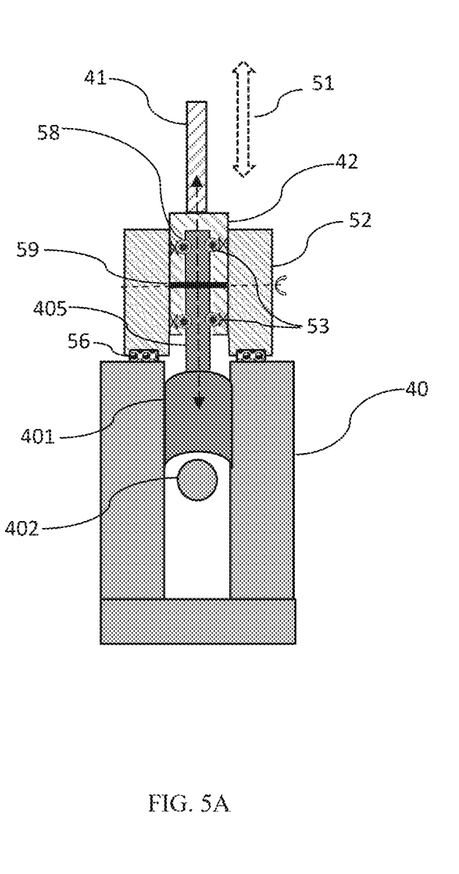
FIG. 5A depicts an overall cross section and the vertical locking mechanism of the tuning probe system perpendicular to the slabline.
Figure 5B:
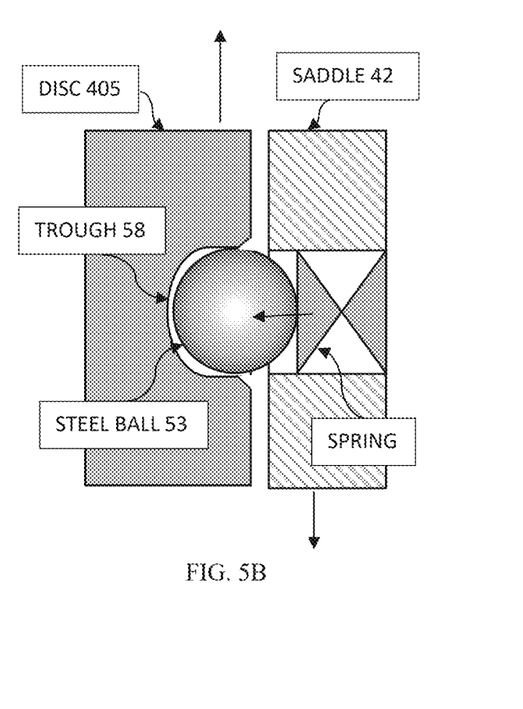
FIG. 5B depicts the steel ball locking detail

The new tuning probe system is shown in FIGS. 4 and 5: it includes a saddle unit 42 attached to the vertical axis 41 like the prior art slug 34 of FIG. 3; it also includes a disc unit 405, which holds, at its periphery the tuning slugs 48, 401 and 407; the slug 407 reflects mostly high frequencies, slug 401 reflects medium frequencies and slug 48 reflects low frequencies. To toggle (rotate) from one slug to another, and by that switch between frequency bands, one must rotate the disc 405 by catching with the tip of the two prongs of the fork 45, which is permanently fixed 46 on the slabline or the tuner housing close to the idle port 47, either below or above the studs 44 on both surfaces of the disc 405, and lift or lower 403 the axis 41, in which case the disc 405 will rotate relative to the bridge 42 and revolve a new slug into position. The new position is secured by the steel balls 53 (FIG. 5) popping into the holes (troughs) 58; in short, to rotate 408 slug 407 into the position of slug 401 one has to catch the fork 45 below the stud 44 and lower the axis 41 in which case the disk 405 will rotate 43 around the center 404 counterclockwise. The vertical travel of axis 41 must be selected such as to allow such rotation without mechanical conflict of the slugs with the center conductor 402. The trace 49, present in all slugs, indicates the depth of the concave bottom surface of the slugs (FIG. 3).

FIG. 5A is a cross section view through the vertical axis 41 of the tuning assembly moving the slug 401 towards or away 51 from the center conductor 402: the bridge unit 42 has the two sets of spring-loaded steel balls 53 popping into troughs 58 and locking the disc 405 at one angle at a time, corresponding to a vertical (tuning capable) position of the associated tuning slug 401; the bridge unit 42 slides seamlessly inside a precise hole in the mobile carriage 52 which slides on rollers 56 along or parallel to the slabline 40; the disc 405 holding the slugs 401 etc. rotates around its center axis 59; the vertical axis 41 lowers or lifts the slug 401 towards or away from the center conductor 402, when outside the reach of the prongs of the fork 45, controlling this way the capacitive coupling and the magnitude of the reflection factor. FIG. 5B is a self-explaining detail showing the steel ball hopping into the troughs creating the interlock mechanism.

The interlock mechanism shown in FIG. 4 uses three sets of diametral pits (troughs) 406 to ensure a minimum of angular play when the slug moves horizontally along the slabline; manufacturing tolerances create minor misalignment of the position of the diametral steel balls 53, the rotation center 59 and the troughs and create, unintentionally, a zero-backlash locking mechanism.

Figure 6:
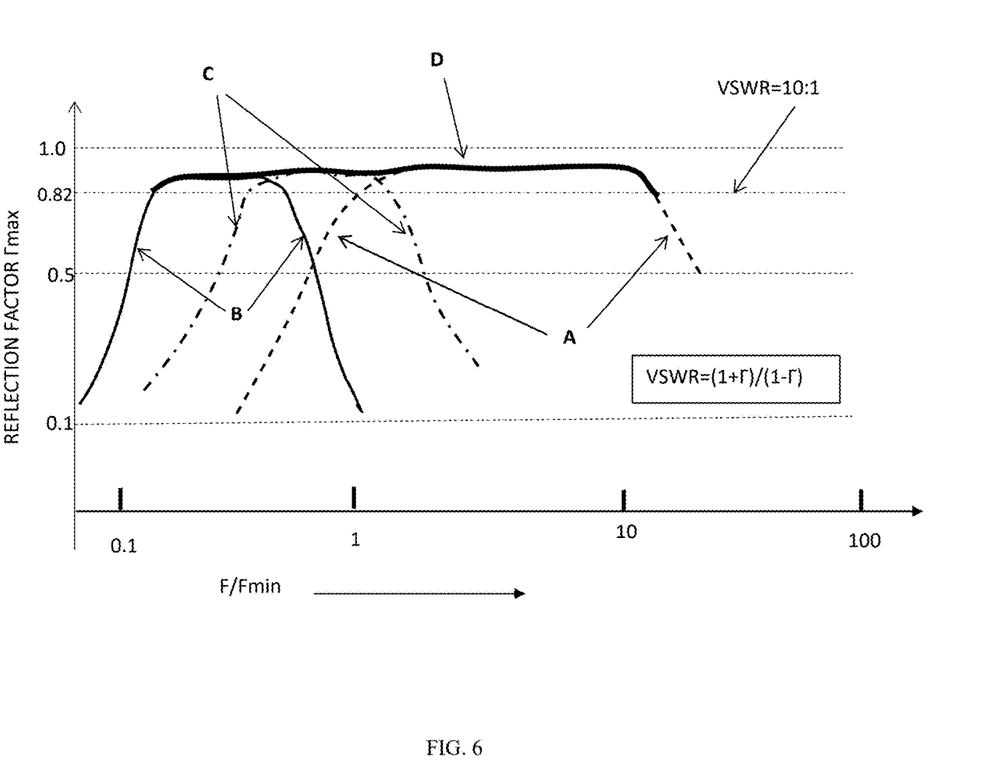
FIG. 6 depicts schematically the overlapping and typical maximum reflection factor of the possible modes created by the various tuning slugs.

The frequency coverage (the range where the tuning slugs create high enough reflection factor ($|\Gamma| \geq 0.82$ or VSWR$\geq$10: 1) at the test port, when inserted closest to the center conductor) of the various slugs considered in this type of apparatus is shown schematically in FIG. 6: the longest slug 48 creates a reflection type B. The shortest slug 407 creates a reflection type A; the medium slug 401 creates a reflection type C; overall using one slug at a time and existing calibration and tuning (impedance synthesis) methods, see ref 7, one covers a frequency range D of one decade at least (Fmax/Fmin$\geq$10) and almost two decades (Fmax/Fmin$\approx$100); this no prior art single tuning slug or single vertical axis tuner of any form can achieve.

Figure 7:
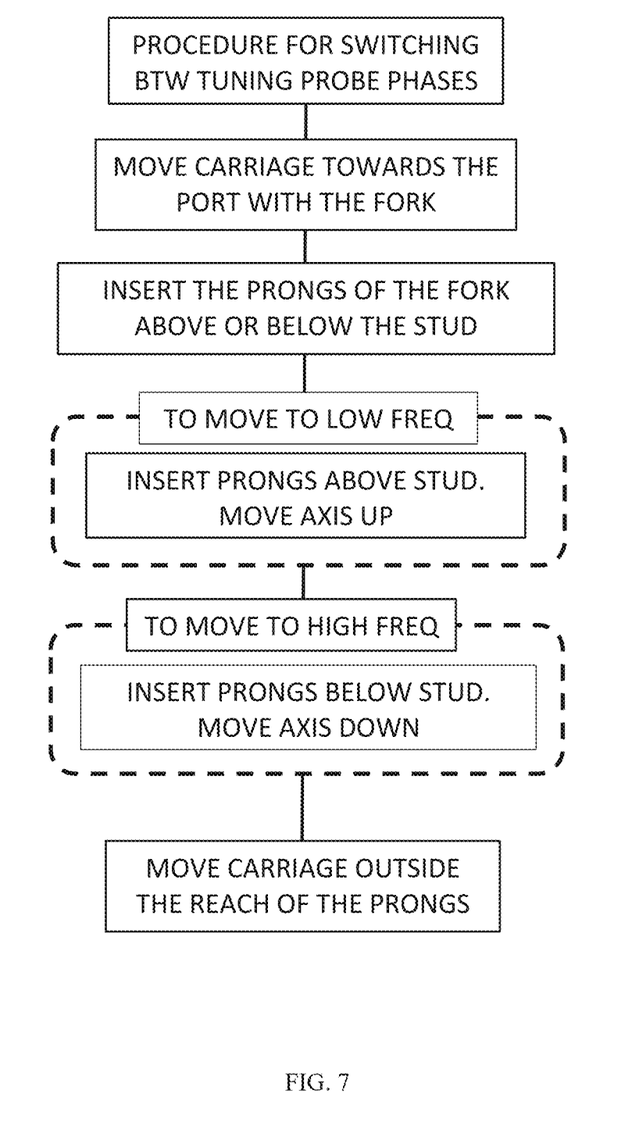
FIG. 7 depicts the flow chart of the procedure for changing slugs and frequency ranges.

The procedure for switching between tuning probe states is shown in the flowchart of FIG. 7: in a first step the carriage 52 is moved towards the tuner port 46 having the fork 45 permanently installed. Then, depending on the actual state of the tuning probe assembly, the vertical position of the axis 41 is arranged for the fork to catch above or below the stud 44; if we want to move to higher frequencies we catch below the stud and move the axis down 43; if we want to move to higher frequencies we catch above the stud and move the axis upwards 408.

The present invention discloses a configurable tuning probe system for single vertical axis load pull tuners, allowing operation in three phases (frequency bands), whereby allowing widening the instantaneous frequency bandwidth of the tuner, without the need for additional electronic and mechanical gear and remote control. The slugs are mounted and controlled, such as to switch between a longer, a shorter and a medium slug in one automatically reconfigurable revolving assembly. Obvious alternatives shall not impede the originality of the idea.

What is claimed is:

1. A remotely configurable tuning probe system for load pull tuner comprising:
   a remotely configurable multi-slug tuning probe, and
   means for remotely configuring the multi-slug tuning probe;
   wherein
   the load pull tuner comprises a slabline with two parallel conductive sidewalls and a center conductor linking two ports, a control port, and an idle port, and at least one remotely controlled mobile carriage, moving along the slabline, and including a single, remotely controlled, perpendicular to the slabline vertical axis mechanism which holds and controls a revolving configurable multi-slug tuning probe assembly;
   and wherein
   the remotely configurable multi-slug tuning probe assembly, linked to the vertical axis mechanism, includes two units:
   a saddle unit which is attached to the vertical axis and has two legs forming a bridge with a channel along the slabline, and
   a disc unit having a thickness, a rotation axis, a front and a back surface, anchored and rotating between the legs of the bridge parallel to the slabline and having, at its periphery, three tuning slugs attached radially at three distinct angles, a first, a second and a third tuning slug, each having a rectangular body, a bottom surface mirroring the center conductor, a different length along the slabline and slide-fitting between the sidewalls of the slabline;

wherein
the rotating disc is lockable at the three angles using an interlock mechanism;
and wherein
the means for remotely configuring the multi-slug tuning probe comprise an unmovable control device and an automated configuration procedure.

2. The interlock mechanism of the remotely configurable tuning probe system of claim 1 comprising: the disc having two studs at same level, close to the periphery, one stud protruding from the front surface and one stud protruding from the back surface, and a set of three pairs of troughs on each surface of the disc, placed diametrically on a concentric circle between the rotation axis and the periphery, and two pairs of steel balls inserted diametral into the legs of the bridge, protruding spring-loaded perpendicularly towards the disc, rolling on the disc, each pair mating with a pair of troughs, hopping into, and fitting snuggly into the troughs as the disc rotates; wherein the disc rotates by sliding between the legs of the bridge and is lockable at the three angles, a forward angle towards the idle port associated with a first pair of troughs, a center angle associated with a second pair of troughs and a backward angle towards the control port associated with a third pair of troughs.

3. The remotely configurable tuning probe system for slide screw load pull tuner of claim 1,
wherein
the first tuning slug is designed for high frequency range, the second tuning slug is designed for medium frequency range and the third tuning slug is designed for low frequency range.

4. The unmovable control device of the configurable tuning probe system of claim 1, comprising a fork, which is attached to the slabline close to the control port and has two horizontal prongs with an opening between them at least as the thickness of the disc and less than the thickness of the disc plus the protrusion of the studs.

5. The automated configuration procedure for switching the configurable tuning probe assembly of the configurable tuning probe system of claim 1 between a low frequency band, a medium frequency band and a high frequency band comprising the following steps:
a) move the carriage towards the control port but outside the reach of the prongs of the fork;
b) to switch to higher frequency band, lift the assembly, move the carriage to allow the prongs of the fork to catch below the studs and lower the assembly for the steel balls to drop and lock into the next trough;
c) to switch to lower frequency band, lower the assembly, move the carriage to allow the prongs of the fork to catch above the studs and lift the assembly for the steel balls to drop and lock into the next trough;
d) move the carriage out of the reach of the prongs.

6. The configurable tuning probe system of claim 5,
wherein
after the automated configuration procedure, the disc remains locked against the legs of the bridge while the carriage and the vertical axis move horizontally and vertically.

7. The configurable tuning probe system of claim 1,
wherein
the vertical axis mechanism and the horizontal position of the mobile carriage of the slide screw load pull tuner are remotely controlled using stepper motors and gear.

* * * * *